Feb. 23, 1943.    H. L. ELFNER    2,311,743
SAFETY PASSING AND BLACK-OUT LIGHTS
Filed March 3, 1942     3 Sheets-Sheet 1

Inventor
Henry Leonard Elfner

By Clarence A. O'Brien
and Harvey B. Jacobson
Attorneys

Feb. 23, 1943.  H. L. ELFNER  2,311,743
SAFETY PASSING AND BLACK-OUT LIGHTS
Filed March 3, 1942   3 Sheets-Sheet 2

Inventor
Henry Leonard Elfner
By Clarence A. O'Brien
and Harvey B. Jacobson
Attorneys Feb. 23, 1943. H. L. ELFNER 2,311,743
SAFETY PASSING AND BLACK-OUT LIGHTS
Filed March 3, 1942 3 Sheets-Sheet 3
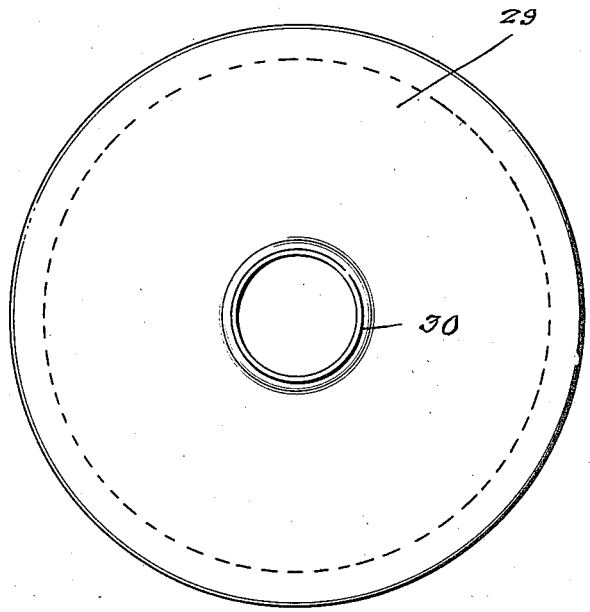
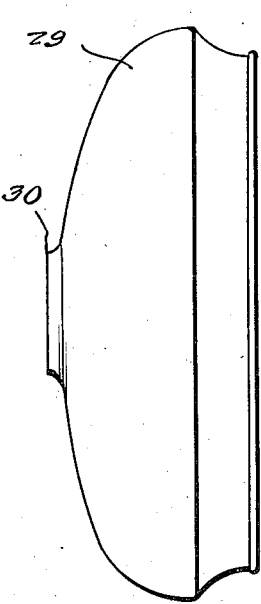
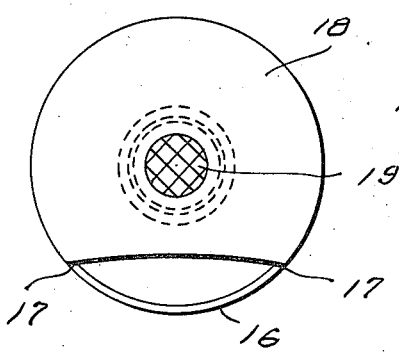
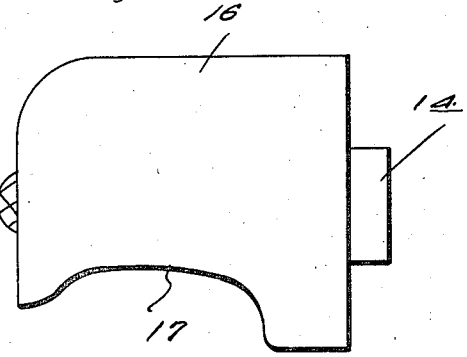
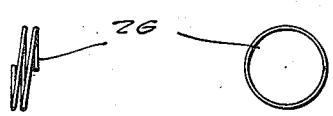
Inventor
Henry Leonard Elfner
By Clarence A. O'Brien
and Harvey B. Jackson
Attorneys Patented Feb. 23, 1943

2,311,743

UNITED STATES PATENT OFFICE 2,311,743

SAFETY PASSING AND BLACK-OUT LIGHT

Henry Leonard Elfner, Indianapolis, Ind., assignor of one-half to James P. Leamon, Indianapolis, Ind.

Application March 3, 1942, Serial No. 433,217

1 Claim. (Cl. 240—8.12)

The present invention appertains to new and useful improvements in vehicle lights and more particularly to a side light for automobiles adapted to serve in the capacity of a safety light affording an oncoming driver clear knowledge of just where the left side of the approaching car is located, and this is a very important factor in driving under "black out" conditions.

The principal object of the present invention is to provide a light structure adapted to be incorporated in the stationary part of vehicle wheel assemblies which will illuminate the road and a portion of the left side of the related vehicle.

Another object of the invention is to provide a light unit of the character stated which is devoid of any moving parts, thus eliminating any necessity of replacing elements due to wear.

Another important object of the invention is to provide a side light for automobiles which will illuminate a portion of the roadway and left side of an automobile to assist motorists in passing under dark conditions.

Other objects and advantages of the invention will become apparent to the reader of the following description.

In the drawings:

Figure 3 is a front elevational view of the hub cap.

Figure 4 is a side elevational view of the hub cap.

Figure 5 is a front elevational view of the light shell.

Figure 6 is a side elevational view of the shell.

Figure 9 is a side elevational view of the spring.

Figure 10 is a front end elevational view of the spring.

Figure 1:
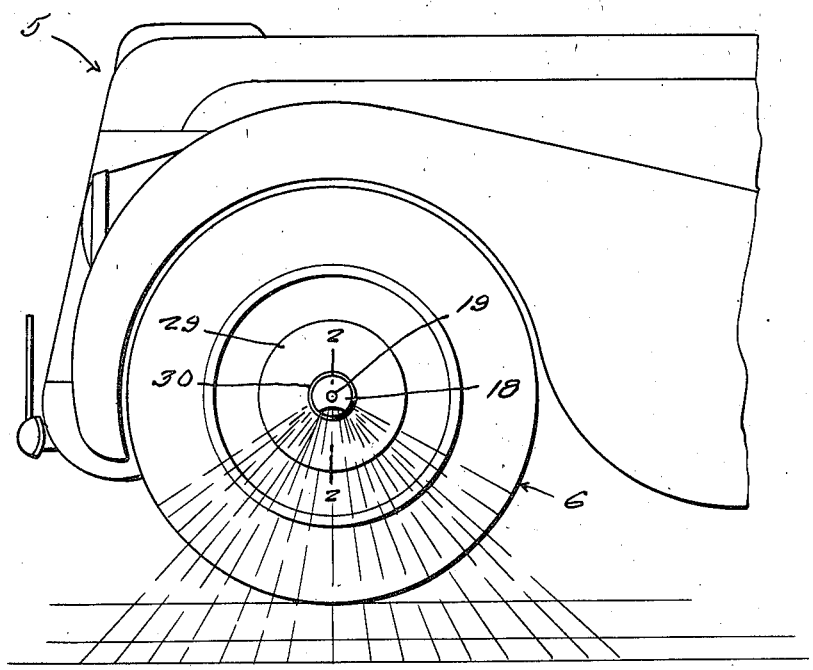
Figure 1 represents a fragmentary side elevational view showing one of the lights.
Figure 7:
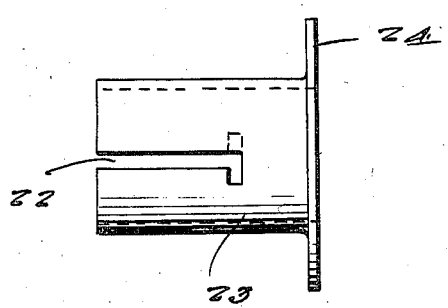
Figure 7 is a side elevational view of the socket.
Figure 8:
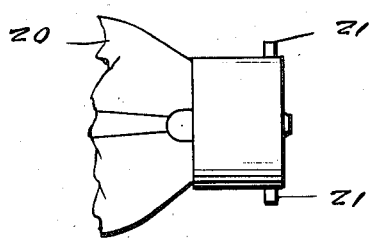
Figure 8 is a fragmentary side elevational view of the bulb.

Referring to the drawings wherein like numerals designate like parts, it can be seen that numeral 5 generally refers to the forward portion of an automobile, of which numeral 6 generally refers to the left front wheel. It is only necessary that the light structure of the present invention be associated with this particular wheel in order to afford an oncoming driver visibility with respect to the left side of the approaching vehicle.

Figure 2:
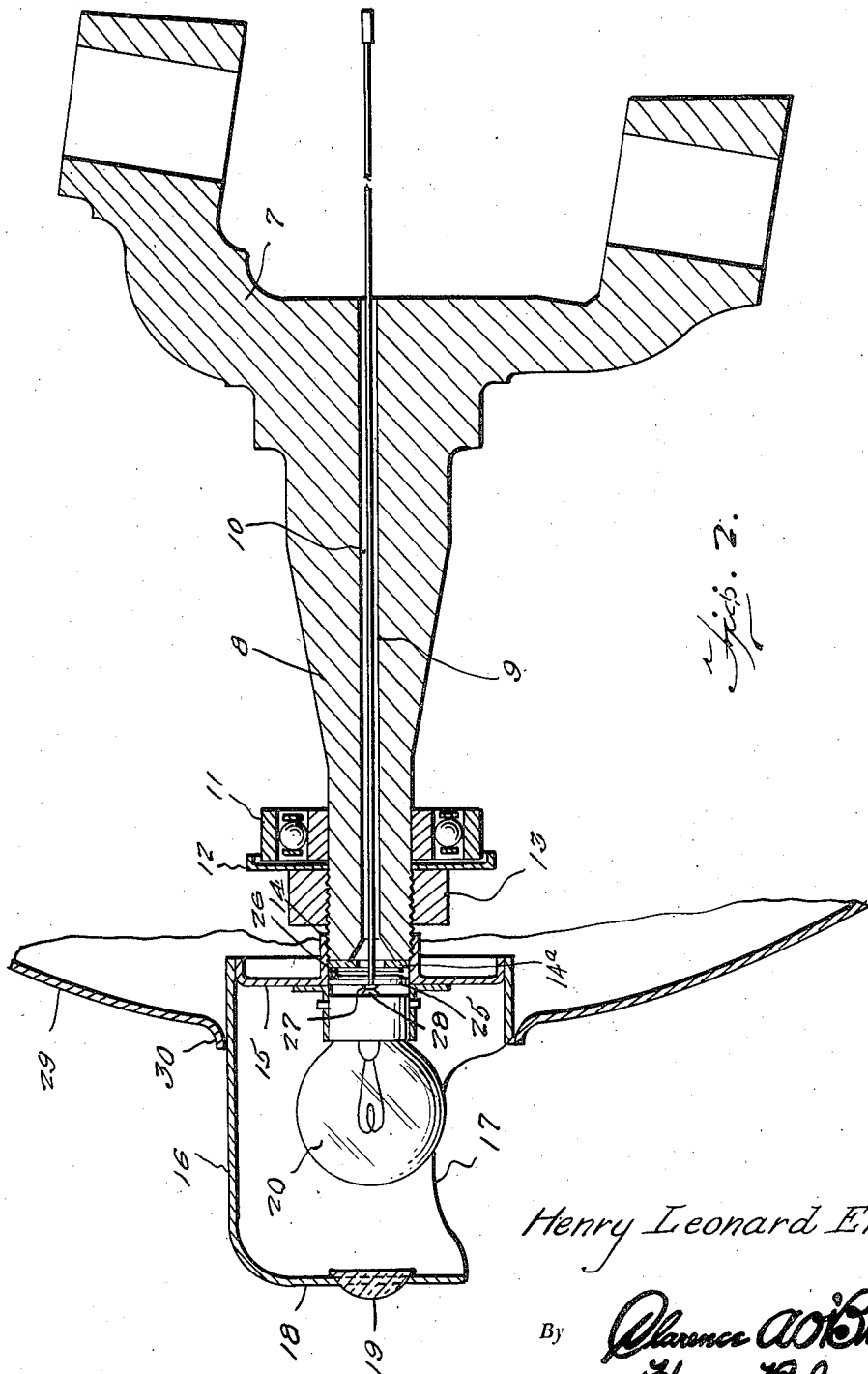
Figure 2 is a fragmentary enlarged sectional view taken substantially on the line 2—2 of Figure 1.

Referring now to Figure 2, it can be seen that numeral 8 denotes a spindle and in order to accommodate the present invention is formed with a longitudinal bore 9 to accommodate a current supply conductor 10.

Numeral 11 denotes the usual wheel bearing assembly outboardly of which is a bearing shield 12 and beyond this the spindle 8 is threaded to accommodate the usual wheel securing nut 13.

The threaded portion of the spindle 8 is threaded for sufficient distance to accommodate an adapter base 15 having an internally threaded portion 14. The adapter further includes a shell 16 the bottom of which is open, and as shown in Figure 2, a substantial portion of each side wall thereof is cut away as at 17 so that there will be some forward and rearward deflection of light, although not as far as a horizontal plane.

A washer 14a is provided at the end of the spindle 8, which maintains the structure of the present invention definitely in place.

The front wall 18 of the shell 16 has a translucent eye 19 therein through which light from a bulb 20 can pass.

The base of the bulb 20 has laterally disposed pintles 21, 21 for disposition in bayonet slots 22 of a socket shell 23, the inner end of which is flanged as at 24 and suitably secured to the outside of the wall 15.

An insulator disk 25 is located in the collar 14 and is normally projected outwardly by a compression spring 26, this plate 25 carrying a contact 27 from which the conductor 10 extends and against which a contact 28 on the lamp base is engageable.

Numeral 29 denotes a hub cap, the central portion of which is cut out and preferably flared outwardly at its edge portion as at 30, to accommodate the shell 16 in the manner shown in Figure 2.

Thus it can be seen that the shell 16 will remain stationary with the spindle 8 as the wheel with its hub cap 29 rotates. Light will be cast on the adjacent wheel as well as on the roadway to afford approaching vehicles clear sight of the approximate side of the approaching vehicle and the immediate roadway. This is an important matter and certainly a safeguarding benefit during black out periods in war time.

As can be seen in Figure 2, the spindle 8 has a bore 9 longitudinally therethrough for the purpose of receiving the conductor wire 10. This, of course, eliminates any necessity for a rotary contact ring and contactor, thus simplifying the construction over various patented structures where electrical connections are made to vehicle wheels.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a vehicle having a steering knuckle including a spindle, a wheel on said spindle including a hub cap rotating therewith and apertured around the spindle, an illuminating assembly comprising a substantially cylindrical shell having closed ends and a bottom side aperture and of substantially larger diameter than said spindle, means to mount said shell on said spindle against rotation and to extend endwise out of said hub aperture coaxially with said spindle comprising a reduced adapter on one end of the shell threaded onto the spindle, a light bulb socket in said shell extending from said end thereof, a light bulb mounted in said socket coaxially with said shell, said opening in the shell being located well below the axis of the shell to direct light rays escaping from the shell generally downwardly, said spindle being axially bored for the extension of electric leads therethrough to said light bulb socket.

HENRY LEONARD ELFNER.